United States Patent [19]

Bissell

[11] Patent Number: 4,683,655
[45] Date of Patent: Aug. 4, 1987

[54] CITRUS FRUIT PEELER

[76] Inventor: Irving J. Bissell, P.O. Box 6506, Fort Lauderdale, Fla. 33316

[21] Appl. No.: 754,839

[22] Filed: Jul. 15, 1985

Related U.S. Application Data

[63] Continuation-in-part of Ser. No. 638,204, Aug. 6, 1984, abandoned.

[51] Int. Cl.⁴ .............................................. A47J 17/04
[52] U.S. Cl. .................................. 30/123.7; D7/147; 30/123.5; 99/584
[58] Field of Search ................. 99/584, 588; 30/123.5, 30/123.6, 123.7, 355, 144; D7/147

[56] References Cited

U.S. PATENT DOCUMENTS 2,692,428 10/1954 Morishita et al. ................ 99/584 X
3,397,455 8/1968 Egge ............................... D7/147 X Primary Examiner—Timothy F. Simone
Attorney, Agent, or Firm—Malin, Haley & McHale

[57] ABSTRACT

A device for rapid peeling of citrus fruit such as oranges comprising a knife with a curved bottom cutting edge, an upper lateral stabilizer fin with thumb abutment and a handle with a "pic" end.

8 Claims, 10 Drawing Figures

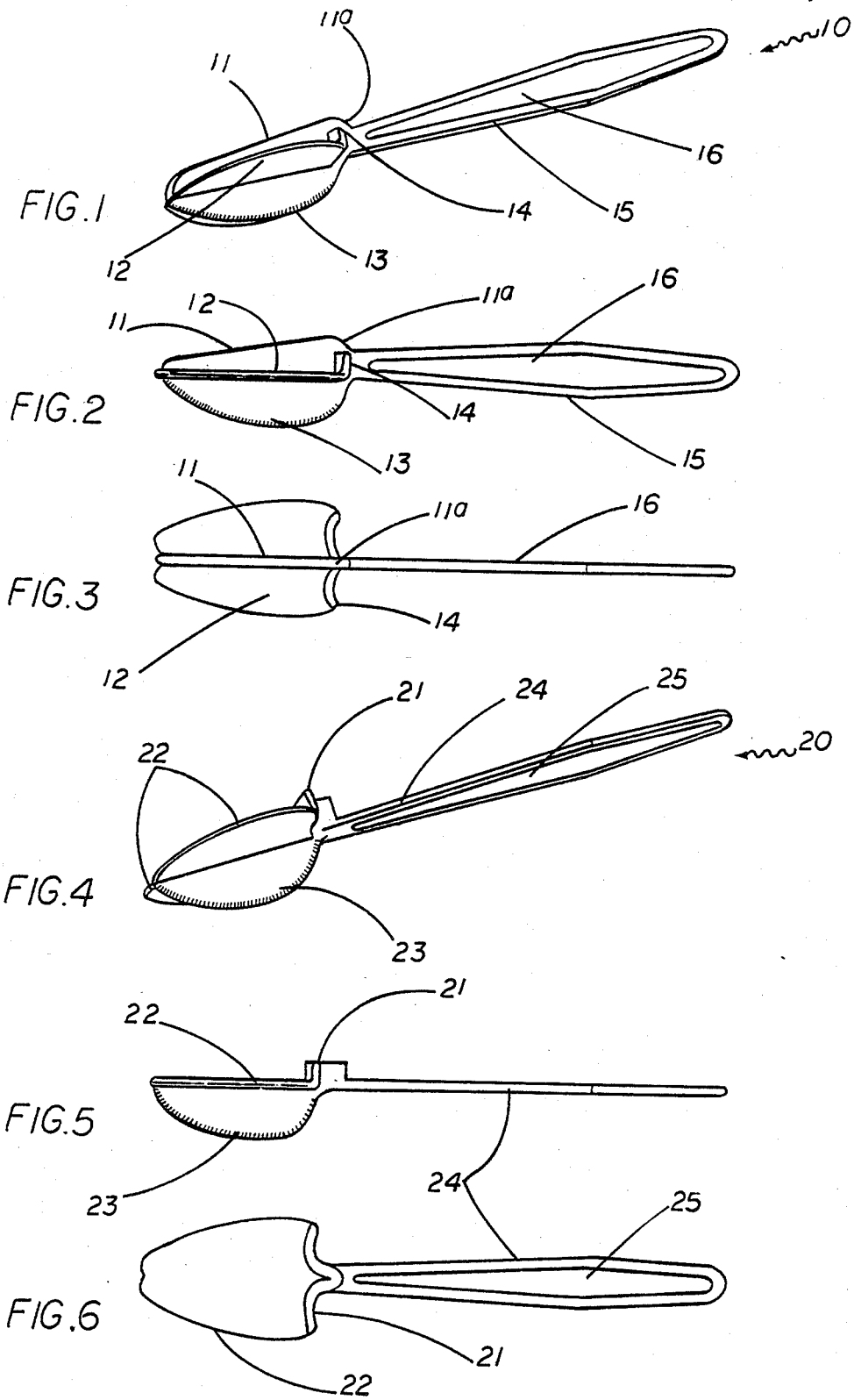

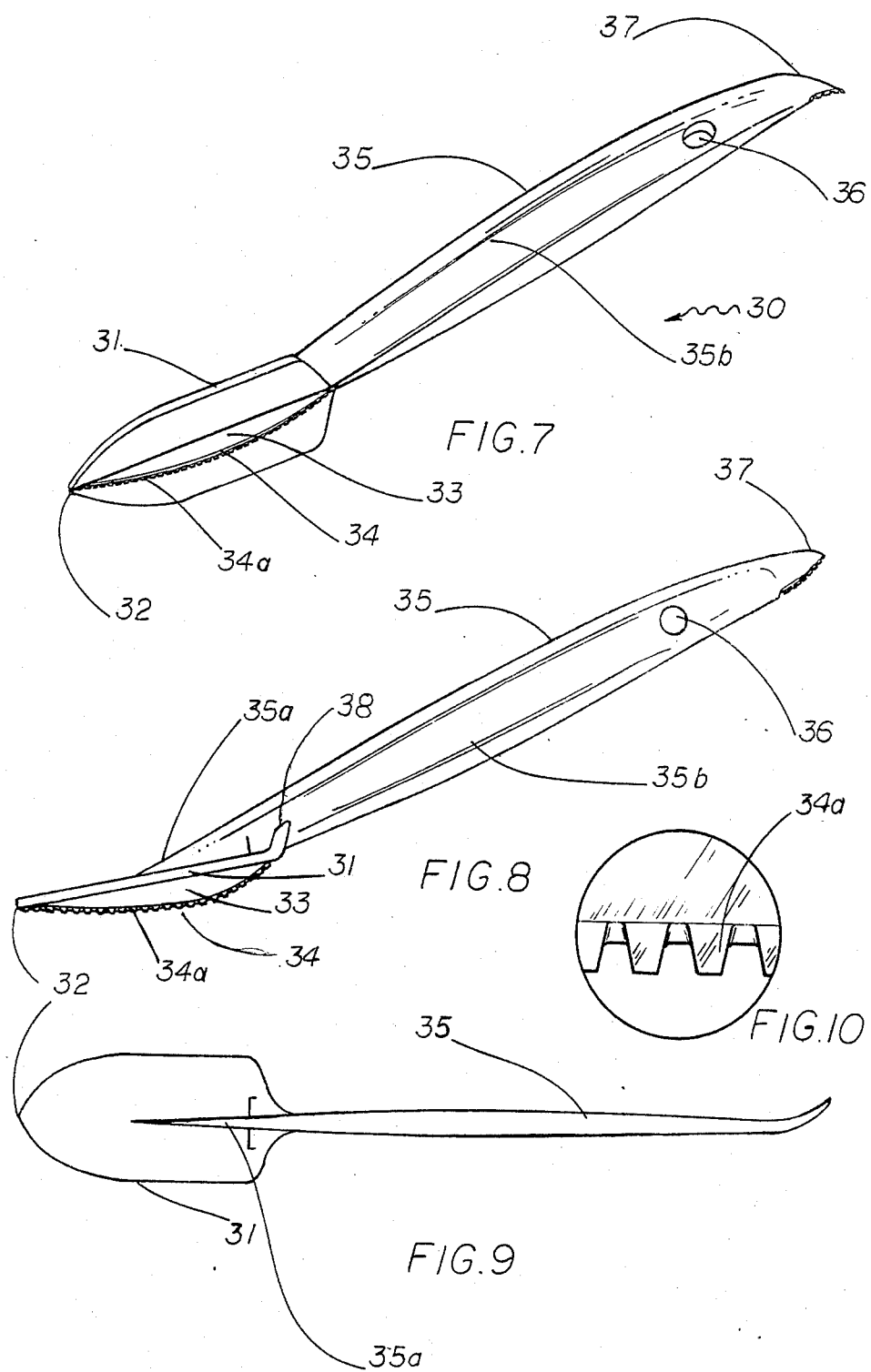

CITRUS FRUIT PEELER

BACKGROUND OF INVENTION

This application is a continuation-in-part of pending U.S. patent application Ser. No. 06/638,204 of Irving J. Bissell for CITRUS FRUIT PEELER filed Aug. 6, 1984, now abnd.

This invention relates to devices for peeling of citrus fruit such as oranges.

Various commercial devices have been provided to assist individuals in peeling citrus fruit, as for example, oranges. Although these devices are effective, they are usually difficult to use and time-consuming in operation.

One object of the present invention is to provide a citrus fruit peeler which can be used with little skill to rapidly remove the rind of a citrus fruit.

Other objects and advantages of this invention will be apparent from the description and claims which follow, taken together with the appended drawings.

SUMMARY OF INVENTION

This invention comprises generally an integral device including a vertical blade, a handle extending rearwardly from the blade and a horizontal stabilizer fin extending laterally from the top of the blade. The blade has a curved bottom knife edge terminating in a forward point. The maximum distance between the knife edge and the stabilizer fin is approximately equal to the thickness of the citrus rind for which the device is to be used. It is also preferred that the stabilizer fin have a thumb-engaging abutment. Maximum stability is attained by having a lateral fin on each side of the blade, however a fin on one side of the blade would be sufficient.

By means of this invention the user scores the rind very rapidly and removes sections after as he scores with the rear end of handle. The entire operation is simple and rapid.

The invention has a number of variations, as for example an upward vertical rib above the stabilizer fin, lower finger engaging means, and a flat handle or vertical handle.

Other variations include having the rear handle extend either obliquely upward or downward or parallel to the length of the flat cutting blade, having the handle extend rearwardly from the rear end of the stabilizer fin means in a direction that either is a straight line continuation of the length of said fin means or that extends along a line oblique to the length of said fin means. Still other variations involve the presence or absence of protuberances associated with the stabilizer fin means and the inclusion or omission of a hole through the rear handle that permits the citrus fruit peeler to be suspended by a hook when stored between uses. The curved bottom cutting edge has serrations that may be in the form of rectangular teeth or pointed teeth or the "pic" end at the rear of handle is with or without teeth on either side or both sides and is curved to conform to the shape of the thumb.

BRIEF DESCRIPTION OF DRAWINGS

FIG. 1 is a bottom perspective view of one embodiment of this invention.

FIG. 2 is a side view of FIG. 1.

FIG. 3 is a planned view of FIG. 1.

FIG. 4 is a bottom perspective view of another embodiment of this invention.

FIG. 5 is a side view of FIG. 4.

FIG. 6 is a plan view of FIG. 4.

FIG. 7 is a bottom perspective view of still another embodiment of this invention.

FIG. 8 is a side view of FIG. 7.

FIG. 9 is a plan view of FIG. 7.

FIG. 10 is an expanded view of 34 of FIG. 7.

SPECIFIC EXAMPLES OF INVENTION

Referring now to the drawings, the embodiment 10 illustrated in FIGS. 1, 2 and 3 has a vertical, flat cutting portion 13 with a curved bottom cutting edge terminating forwardly in a point. Extending laterally on each side of the top of cutting portion 13 are two stabilizer fins 12 having raised, indented protuberances 14. Extending vertically above blade portion 13 is a flat stabilizer fin 11 which includes an abutment portion 11a extending rearwardly into handle 15 having a holding depression 16.

The embodiment 20 illustrated in FIGS. 4, 5 and 6 is similar but has no vertical stabilizer fin. This example has a vertical, flat knife blade portion 23 with a curved bottom cutting portion. On top of this extend a pair of stabilizer fins 22 with upwardly extending protuberances 21. Rear handle 24 having a central depression 25 extends rearwardly from the blade portion 23.

The embodiment 30 illustrated in FIGS. 7, 8 and 9 differs from the previous embodiments raised in that the thumb engaging abutment 38 is less pronounced than 14 and 21. The stabilizer fins in embodiment 30 are thicker and provide sufficient thumb abutment in themselves with just minor raising rear handle at rear of fin. Referring to FIGS. 7 to 9, the embodiment 30 comprises a pair of flat essentially horizontal stabilizer fins 31 having a pointed forward end 32. A flat elongated knife blade portion 33 extends forward in an essentially vertical plane downward from the stabilizer fins 31. As in the previous embodiments, the elongated knife blade portion 33 has a curved bottom cutting edge 34 that extends forward of the forward edge of a rear handle 35 and terminaates below the pointed forward end 32. It is preferred the blade have a larger radius at the forward end and a smaller radius at rear end. Thin peeled citrus fruits can be cut with forward end of blade and thicker skinned citrus can be with rear end or handle end of blade. The radius could be the same or opposite at the rear or forward end of blade as raising or lowering thumb at thumb abutment can also control depth of cut. In this embodiment, the rear handle 35 extends rearward in an obliquely upward direction in an essentially vertical plane from the upper surface of the stabilizer fins and includes a front portion 35 that is equivalent to a short version of the essentially vertical stabilizer fin 11 of the first embodiment of FIGS. 1 to 3.

The curved bottom cutting edge of FIG. 10 any of the embodiments may be provided with cutting characteristics by providing serrations in the form of rectangular or square teeth separated by rectangular or square spaces or pointed teeth separated by triangular spaces along the length of the bottom exposes edge of the flat elongated knife blade portion 13 or 23 or 33. Experience has shown that nearly rectangular beveled square teeth separated by nearly rectangular beveled spaces along the bottom cutting edge of the flat blade portion provide very efficient cutting.

In the various embodiments, the height of the flat blade portion 13 or 23 or 33 below the stabilizer fins 12 or 22 or 31, respectively, increases rapidly in a forward direction from the rear handle 15 or 24 or 35 to a maximum height approximately the thickness of the rind of the citrus fruit to be peeled. This height decreases toward the pointed forward tip formed at the forward ends of the essentially horizontal stabilizer fins 12 or 22 or 31 to define the curved bottom cutting edge 34 of the peeler 30.

It is preferred that stabilizer fin be essentially flat or upwardly curved so as to minimize surface contact and friction between stabilizer fin and orange peel. It is also preferred that stabilizer fin be of sufficient size to act as safety shield to keep user from cutting other hand or fingers holding orange stabilizer fin must be of sufficient size so as to not penetrate the outer surface of the orange peel. Top of stabilizer fin is index finger abutment to enable user easy control of downward pressure of blade on peel while cutting. It is preferred that forward end of stabilizer fin come to a blunt point to indicate direction of cutting without endangering the user, however any shape will not significantly hinder the performance of tool.

Another feature disclosed in the third embodiment is an aperture 36 through rear handle 35. When the citrus fruit peeler of the present invention is not in use, it can be stored in a readily accessible spot by inserting aperture 36 into a hook that supports the citrus fruit peeler of this invention by hanging.

Still another feature of this invention is a transversely curved rear end portion 37 for rear handle 35. The rear end portion 37 terminates in a point and at least one edge thereof is serrated. The utility of this feature will be explained later.

In order to operate the citrus fruit peeler 30 of the third embodiment of this invention, the user places his forefinger on the upper surface of the essentially horizontal stabilizer fins 31 with his thumb abutting the rear edge of one of the fins 31 to one side of front portion 36 of rear handle 35 at abutment 38. The user's other three fingers curl around the obliquely and upwardly extending rear handle 35 to provide a rigid support for the citrus fruit peeler 30. If the stem end of the citrus fruit to be cut is assumed to be located at its "north pole," a number of longitudinal cuts is made from "north pole" to "southpole". The number of cuts required depends on the size of the fruit. The cuts are made by engaging the bottom cutting edge 34 into the rind of the citrus fruit while moving the peeler from "pole" to "pole". The longitudinal position of the user's thumb over the fins 31 determines the exact position along the bottom cutting edge 34 that engages the ring. Tilting the stabilizer fin to the peel can control depth of cut. Selection of the proper thumb position is determined by experience based on the thickness of rind to be removed.

Lowering thumb partly below stabilizer fin enables user a second means of reducing depth of cut by efficiently lowering stabilizer plane and reducing blade depth at rear of blade. Thumb abutment also enables user to saw through peel or cut by pushing and pulling. After completing the longitudinal cuts to form a number of peel wedges, the peeler is rotated 90 degrees and the user inserts the transversely curved rear end portion 37 below each peel wedge with his thumb over the peel wedge to be removed and slides the peeler 30 from top to bottom of the peel wedge while pulling out the rind from the fruit.

The peeler of this invention can also make a lemon twist by making a spiral cut.

The peelers described in this specification represent several embodiments thereof. It is understood that various changes that become obvious from the present description are included in the scope of this invention which is defined by the claimed subject matter that follows.

I claim:

1. A device for rapidly peeling citrus fruit having a rind, comprising: an essentially horizontal flat longitudinally extending stabilizer portion having a front and rear; an elongated essentially vertical flat blade portion which extends downwardly from and is substantially coextensive with said stabilizer portion and has a curved bottom cutting edge extending between the ends of said blade portion; an angular essentially vertical rear handle portion merging into said stabilizer portion; said handle portion and the rear of said stabilizer portion forming an open thumb-engaging abutment means.

2. The device of claim 1 wherein said blade portion is of greatest depth near its rear and decreases from said depth forwardly to its front end.

3. The device of claim 1 wherein said cutting edge comprises serrated teeth having a flat bevelled outer cutting surface and bevelled flat inner edge spaced lower than the teeth.

4. The device of claim 2 wherein said depth decreases forward to a point at its front end.

5. The device of claim 1 wherein said handle portion contains a transversely curved rear end portion.

6. The device of claim 5 wherein said curved rear end portion has serrated teeth.

7. The device of claim 5 wherein said curved end portion conforms to the shape of the bottom and end of thumb with beveled side cutting edges and pointed end.

8. The device of claim 1 wherein said thumb-engaging abutment means includes protuberance means extending upwardly from the rear of said stabilizer portion.

* * * * *